United States Patent [19]

Patterson

[11] 4,163,294
[45] Aug. 7, 1979

[54] TOILET FACILITY

[76] Inventor: David D. Patterson, 142 Bradford, Seward, Nebr. 68434

[21] Appl. No.: 852,622

[22] Filed: Nov. 18, 1977

[51] Int. Cl.² ............................................. A47K 11/02
[52] U.S. Cl. ........................................ 4/111; 4/111.1; 4/111.2; 4/111.5
[58] Field of Search ................ 4/115, 116, 111, 111.1, 4/111.2, 111.5; 210/220; 52/199, 72

[56] References Cited

U.S. PATENT DOCUMENTS

| | | | |
|---|---|---|---|
| 679,912 | 8/1901 | Preuthun | 52/199 X |
| 791,149 | 5/1905 | Hellyer | 52/199 |
| 1,080,137 | 12/1913 | Carter | 52/199 |
| 3,049,489 | 8/1962 | Ciabattari | 210/220 |
| 3,355,019 | 11/1967 | Mitchell | 210/220 X |
| 3,374,893 | 3/1968 | Stretton | 210/220 X |
| 3,423,766 | 1/1969 | Eger | 4/115 |
| 3,447,167 | 6/1969 | Harding | 4/116 |
| 3,474,468 | 10/1969 | Blankenship | 4/111.5 |
| 3,543,294 | 11/1970 | Boester | 210/220 X |
| 3,601,821 | 8/1971 | Corsiglia | 4/115 X |
| 3,629,874 | 12/1971 | Bellen | 4/115 X |
| 3,841,997 | 10/1974 | McGree | 210/220 X |
| 3,950,249 | 4/1976 | Eger et al. | 210/220 |
| 4,031,572 | 6/1977 | Harding | 4/115 X |
| 4,036,754 | 7/1977 | Peasley | 210/220 X |

*Primary Examiner*—Henry K. Artis
*Attorney, Agent, or Firm*—Gravely, Lieder & Woodruff

[57] ABSTRACT

A toilet facility that is completely independent of water supply and sewer lines includes a house having a waste-receiving tank within it and another tank located outside the house. The two tanks are connected by a transfer pipe provided with a pump for pumping the waste from the inside tank to the outside tank. The outside tank is provided with a discharge pipe leading from it, and this pipe likewise has a pump for removing waste from the outside tank. The discharge pipe for the outside tank easily connects with a collection receptacle that can be detached and disposed of. Each tank contains an aeration pipe to which an air compressor is connected, thus enabling pressurized air to bubble through the waste in the two tanks and to activate aerobic bacteria in the waste. Each tank also contains a heating element which normally maintains the waste in the tank at about 97° F., but has the capability of elevating the waste to a temperature above the boiling point of water so that the water may be evaporated from the waste. The pump in the discharge line may not be energized within 48 to 96 hours of the last operation of the pump in the transfer line so as to provide sufficient time to purify the waste in the outside tank after the last addition to that tank. The house has a translucent dome-shaped roof provided with a gutter at its lower edge and a vent that raises and lowers at its top. Major components of the house are formed from plastic using rotational molding techniques.

21 Claims, 12 Drawing Figures

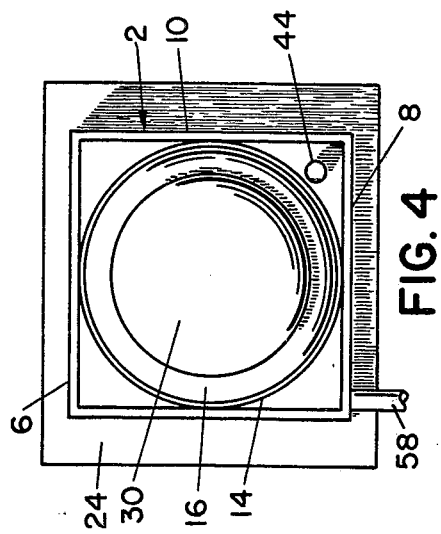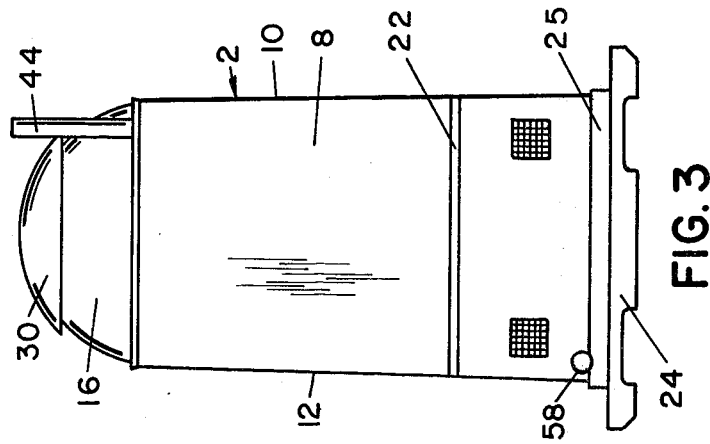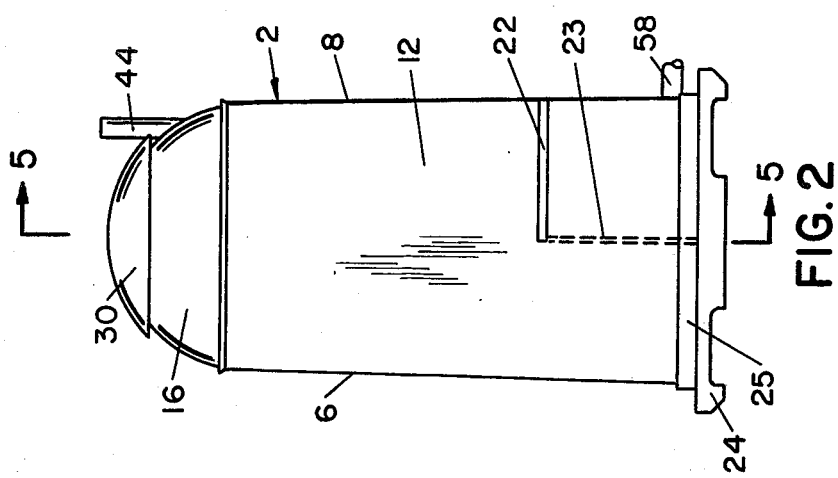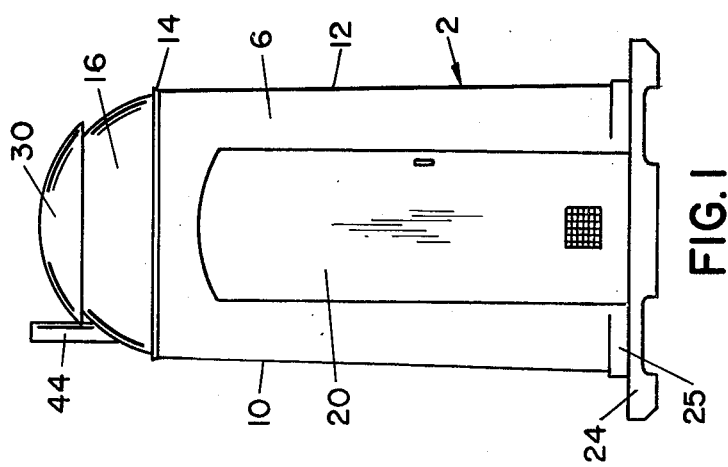

TOILET FACILITY

BACKGROUND OF THE INVENTION

This invention relates in general to toilet facilities and more particularly to a toilet facility that operates independently of water supply and sewer lines.

The traditional outhouse or vault-type privy, while capable of being located almost anywhere, pollutes ground water and is a source of offensive odors. As a consequence, governmental organizations are restricting its use. Nevertheless, the need for toilet facilities that will operate independently of external water supply and sewage systems exists. For example, most state and national parks are much too large to provide water and sewer lines at each wilderness location where a toilet facility is necessary. Similarly, campgrounds are often located remote from water lines and sewers. Even in urban areas portable toilet facilities find widespread use, particularly at construction sites and where large gatherings are expected for short durations. Many homeowners who have swimming pools or tennis courts find it desirable to have toilet facilities adjacent to their swimming pool or tennis court, yet cannot justify the cost of running water and sewer lines to them.

While the traditional outhouse is giving way to portable toilets, many of which are molded from synthetic resinous materials and are entirely self-contained, these toilets rely on chemicals to break down the waste material and prevent offensive odors. As a consequence, they have extremely limited capacity, and the chemicals must be pumped out and replaced at relatively frequent intervals.

SUMMARY OF THE INVENTION

One of the principal objects of the present invention is to provide a toilet facility which is highly sanitary, yet does not require sewer or water lines or specialized chemicals. Another object is to provide a toilet facility which does not pollute ground water. A further object is to provide a toilet facility which has an extremely large capacity, yet is highly compact. An additional object is to provide a toilet facility that operates on the aerobic digestion principle to purify waste. Still another object is to provide a toilet facility which is simple in construction and easy to manufacture and maintain. Yet another object is to provide a toilet facility that conserves water. Still another object is to provide a toilet facility which is easily shipped and stored. These and other objects and advantages will become apparent hereinafter.

The present invention is embodied in a toilet facility including an enclosure, a first tank in the enclosure, a second tank connected to the first tank, and means for aerating the waste material in at least one of the tanks. The invention also consists in the parts and in the arrangements and combinations of parts hereinafter described and claimed.

DESCRIPTION OF THE DRAWINGS

In the accompanying drawings, which form part of the specification and wherein like numerals and letters refer to like parts wherever they occur:

FIG. 1 is a front elevational view of the house forming part of the toilet facility of the present invention;

FIG. 2 is a side elevational view of the house;

FIG. 3 is a rear elevational view of the house;

FIG. 4 is a top plan view of the house;

DETAILED DESCRIPTION

Figure 5:
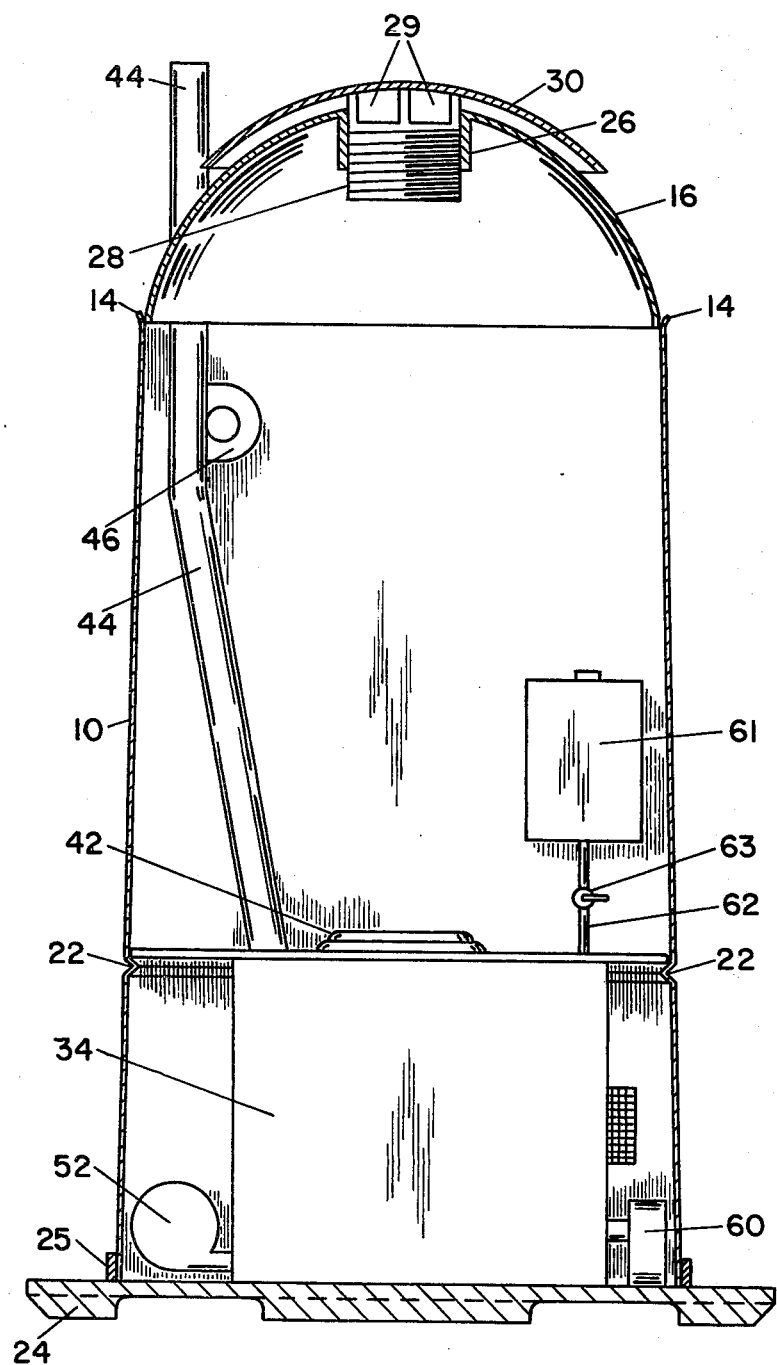
FIG. 5 is a sectional view of the house taken along line 5—5 of FIG. 2.

Referring now to the drawings, A designates a toilet facility which is wholly independent of water and sewer lines. The toilet facility A does, however, require electrical energy for its successful operation, and this energy may be supplied from a power line that is run to the toilet facility A. In comparison to water and sewer lines, electric lines are quite inexpensive to install and maintain.

The toilet facility A includes a house 2 having front and back walls 6 and 8 and left and right side walls 10 and 12, all of which are molded as an integral unit from an opaque plastic. Near their upper ends, the walls 6, 8, 10, and 12 merge into a circular configuration which terminates at an outwardly directed lip 14. Furthermore, the walls 6, 8, 10, and 12 converge slightly toward their upper ends so that the house is larger at its lower end than at its circular upper end. This enables the integrally formed walls 6, 8, 10, and 12 of several houses to be nested for shipping purposes. Projecting upwardly from the circular lip 14 is dome-shaped roof 16 that is bolted to the side walls 6, 8, 10, and 12 and is formed from a translucent plastic. The front wall 6 has a door opening 18 which is normally closed by a door 20 that is hinged to the wall 6. The back wall 8 and the adjacent portions of the side walls 10 and 12 have inwardly directed ribs 22 (FIG. 5) which lie in a common horizontal plane located at about seat level and extended between the two side walls 10 and 12. At the forward ends of the ribs 22 therein is a partition wall 23 (FIGS. 2 and 6), the upper end of which is at the elevation of the ribs 22. In addition, the house 2 includes a base 24 that is molded from a high strength plastic and has an upwardly directed mounting ring 25. The walls 6, 8, 10, and 12 rest on the base 24 with their lower ends being received in and bolted to the ring 25 on the base 24. The base 24 has parallel grooves which extend in both directions and open downwardly. The grooves are arranged in pairs and spaced apart sufficiently to enable the tines of a fork lift truck to enter them and lift the entire house 2 upwardly. The base 24 may be ribbed and covered with a corrugated plastic floor to reduce its weight.

The dome-shaped roof 16 at its center is fitted with a collar 26 (FIG. 5) that extends downwardly into the interior of the house 2 and has inwardly presented threads. The collar 26 forms a hole in the roof 16 and threaded through the collar 26 is a sleeve 28 that has apertures 29 at its upper end. Attached to the sleeve 28 is dome-shaped cap 30 that closes the upper end of the sleeve 28 and overlies the surrounding portion of the roof 16. The cap 30 possesses the same contour as the roof 16. By rotating the sleeve 28 within the collar 26, it is possible to move the cap 30 upwardly away from the roof 16 or to lower it against the roof 16. In the former position, the interior of the house 2 is vented through the apertures 29 in the sleeve 28, but in the latter the roof 16 is completely sealed.

The house 2 including the walls 6, 8, 10, and 12, the base 24, and a dome-shaped upper end similar in configuration to the roof 16 are all molded as a unit from high strength plastic using rotational molding procedures. This is a technique used to produce large plastic shapes such as spheres and liquid tanks. Once the unit is molded and cured, the base 24 is cut off and likewise so is the dome-shaped upper end, leaving only the walls 6, 8, 10, and 12. Thereupon, the door 20 is cut from the front wall 6 and attached to what remains of the wall 6 by hinges. A lock is installed in the same manner to secure the door 20 in its closed position. The dome-shaped end is cut down to form the dome-shaped cap 30 which is attached to a sleeve 28 for installation on the dome-shaped roofs 16. Also the detached base 24 is fitted with its mounting ring 25. The wall units, that is, the integral units formed by the walls 6, 8, 10, and 12, in this condition are easily nested for shipping and storage purposes. Likewise, the base 24 and dome-shaped roofs 16 with the caps 30 on them are also shipped in highly compact arrangements. Once the nested wall units, the roofs 16, and the bases 24 arrive at their destination, they are assembled into houses 2. At this time, the partition wall 23 is inserted between the side walls 10 and 12.

The partition wall 23 together with the adjacent portions of the side walls 10 and 12 and the opposite portion of the back wall 8 form a box 32 (FIGS. 5 and 6) within the house 2, and the box 32 contains a primary treatment tank 34 having an open top that is located below the elevation of the ribs 22. The box 32 and the tank 34 within it are covered by a top 38 having a hole 40 that is in turn covered by a toilet seat 42. The top 38 rests on the ribs 22 and the upper edge of the partition wall 23, and hence is at about seat level.

The box 32 and its tank 34 are ventilated through a vent stack 44 which extends upwardly from the top of the tank 34 and passes through the top 38 near one of the back corners for the house 2. The vent stack 44 extends upwardly through the interior of the house 2 and projects through the roof 16 at the side of the cap 30. The portion of the stack 44 located immediately below the roof 16 is fitted with a draft inducer 46 which is a small electrically powered fan bolted to the wall of the stack 44 and having a vaned rotor that projects into the stack 44. The rotor moves air upwardly through the stack 44.

Figures 7, 8, 9:
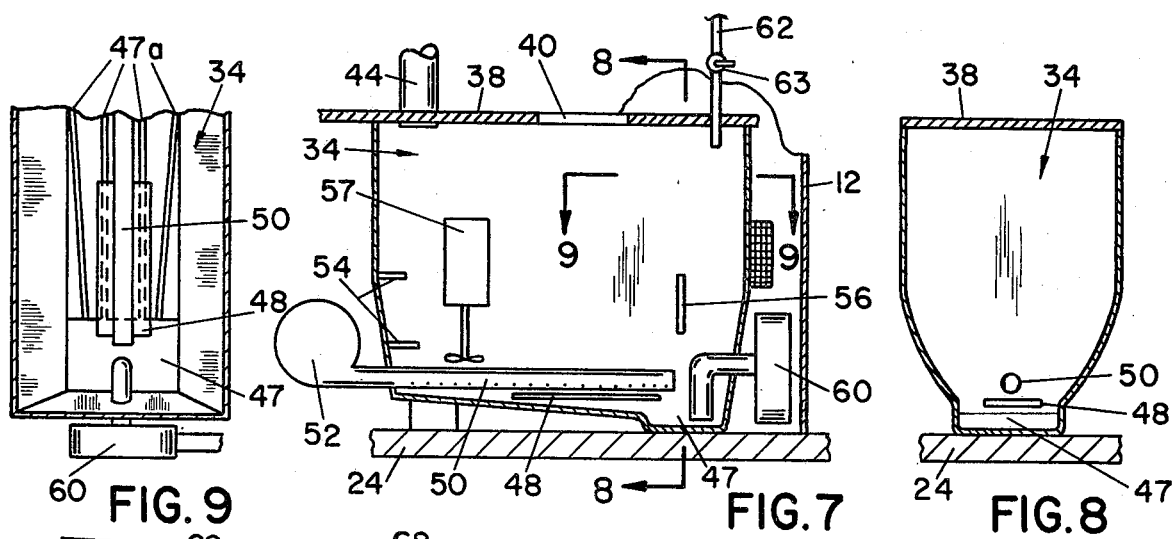
FIG. 7 is a sectional view taken along line 7—7 of FIG. 6 and showing the interior of the primary tank.
FIG. 8 is a sectional view of the primary tank taken along line 8—8 of FIG. 7.
FIG. 9 is a fragmentary sectional view of the primary tank taken along line 9—9 of FIG. 7.

The tank 34 (FIGS. 7-9) is formed from a corrosion resistant material, preferably one that may be cast or molded, such as fiberglass. While the tank 34 is generally rectangular in configuration, it is larger at its top than at its bottom. This derives from the fact that the side and end walls of the tank 34 slope inwardly toward the bottom wall. Moreover, the bottom wall slopes downwardly to a sump 47 at one end of the tank 34, and the sump 47 forms the lowest part of the tank 34. The bottom wall contains several channels 47a that lead to the sump 47.

Located within the tank 34 is a heating element 48 (FIGS. 7-9) of the electrical resistance variety. The heating element 48 should be capable of maintaining the waste material in the tank 34 at the temperature most conducive to the propagation of aerobic bacteria in it, and that temperature is between 95° F. and 100° F. It should further be capable of operating at a much higher temperature, one that will boil water in the tank 34. If the tank 34 is formed from a cast or molded material, the heating element 48 may be embodied within its bottom wall. To prevent loss of heat, the walls of the tank 34 are insulated.

The tank 34 (FIGS. 7-9) further has an aeration pipe 50 extended along its bottom surface, and this pipe contains a multitude of small discharge orifices that open downwardly. The pipe 50 passes through the end of the tank 34 located remote from the sump 49 and is connected to a small air compressor 52 which may be located within the box 32 of the house 2 or externally of the house 2. The compressor 52 delivers pressurized air to the aeration pipe 50 so that the air discharges from the apertures in that pipe and bubbles through waste material in the tank 34. In addition, the tank 34 contains a water level probe 54 and temperature sensing probe 56. The water level probe 54 is electrically operated and through the appropriate circuitry is connected to the heating element 48, so that if the water level within the tank 34 drops below a predetermined point, the heating element 48 will no longer operate. This prevents the heating element 48 from burning out in the event there is no water in the tank 34 to cool it. The temperature probe 56 is likewise connected to the heating element 48 through appropriate circuitry, and it monitors the temperature of the water within the tank 34 and controls the heating element 48 such that the temperature remains substantially constant at about 97° F. Finally, the tank 34 also contains a cutter 57 for shredding solids within the waste material.

Figure 6:
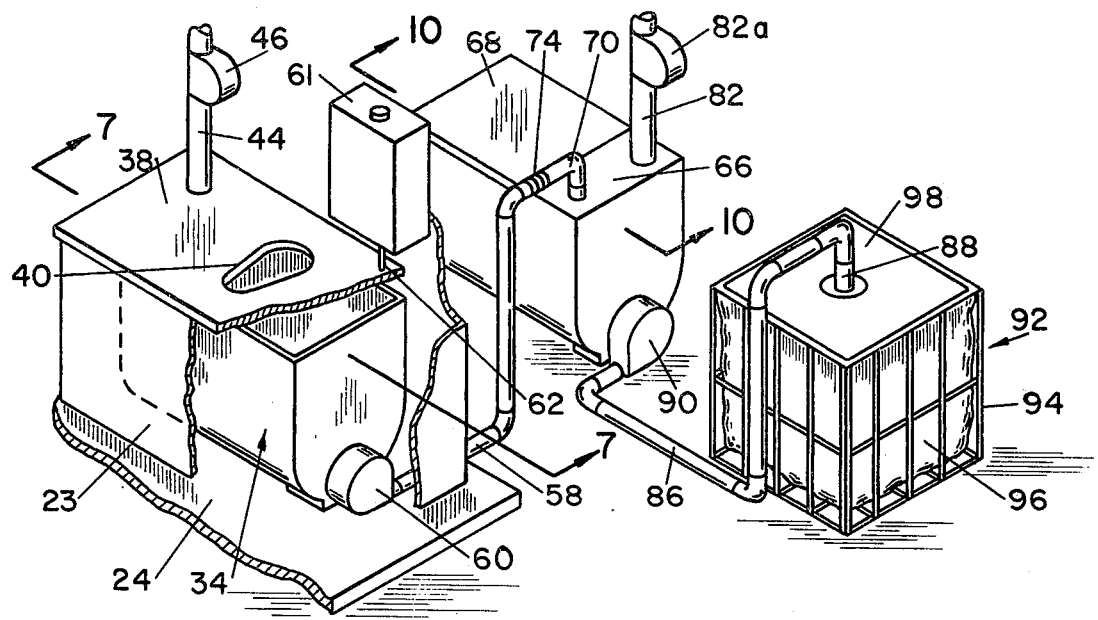
FIG. 6 is a perspective view showing the two tanks and the collection receptacle of the toilet facility.

While the aeration pipe 50 extends into one end of the tank 34, a transfer pipe 58 projects out of the other end wall, that is the end wall adjacent to the sump 49, and this pipe has its lower end within the sump 49 (FIG. 6). The transfer pipe 58 is connected with a pump 60 located within the box 32, and the pump 60 is also connected to the water level sensing probe 54 through appropriate circuitry. The arrangement is such that the pump 60 is energized when the level of the liquid waste within the tank 34 reaches a predetermined elevation, and continues to operate until the water level drops to another predetermined level.

On occasion, more water will evaporate from the tank 34 than is introduced into it through normal use. In that case, water must be supplied to the tank 34 to sustain the aerobic bacteria in the waste, and that water is derived from a water supply tank 61 attached preferably to the back wall 8 within the house 2. The supply tank 61 preferably has a capacity of 5 or more or less gallons, and is connected to the primary tank 34 through a feed line 62 that enters the upper end of the tank 34. The feed line 62 contains a manually operated valve 63.

Figures 10, 11, 12:
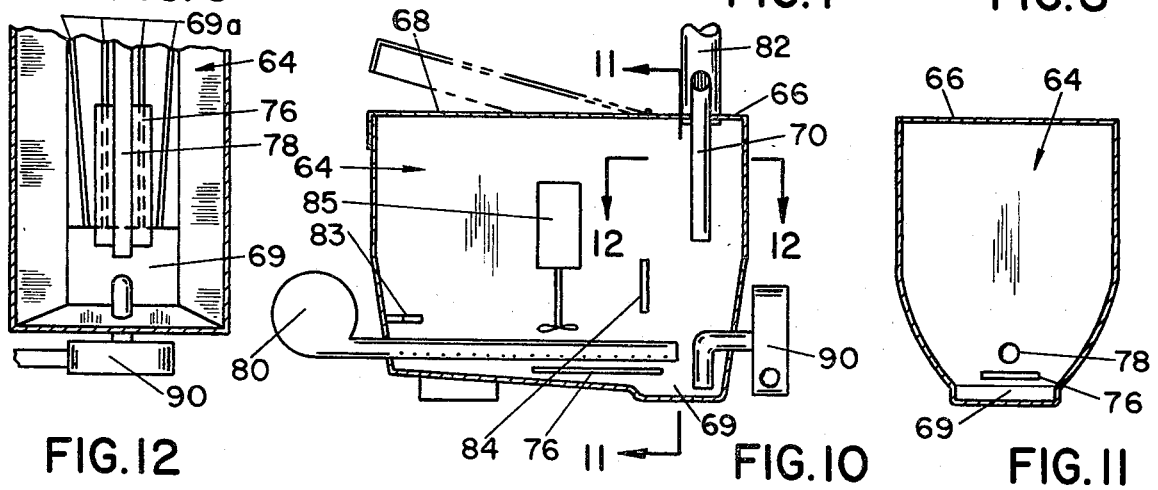
FIG. 10 is a sectional view taken along line 8—8 of FIG. 6 and showing the interior of the secondary tank.
FIG. 11 is a sectional view of the secondary tank taken along line 11—11 of FIG. 10.
FIG. 12 is a fragmentary sectional view taken along line 12—12 of FIG. 10.

In addition to the house 2 and its primary treatment tank 34, the toilet facility A further includes a secondary tank 64 (FIGS. 10-12) that is located externally from the house 2. The secondary tank 64 is likewise formed from a corrosion resistant material which is preferably a cast or molded material such as polyflin rotationally molded fiberglass. Moreover, the tank 64 is completely closed, it having a top wall 66 provided with a hinged cover 68 for providing access to the interior of the tank 64. The walls of the tank 64 are insulated to prevent loss of heat. Like the tank 34, the side and end walls of the tank 64 slope inwardly to the bottom wall which in turn slopes downwardly to a sump 69 at one end of the tank 64. The bottom wall contains channels 69a that lead to the sump 69.

Extending into the top wall 66 for the tank 64 (FIGS. 10-12) is an inlet pipe 70, and this pipe is connected to the transfer pipe 58 of the primary tank 34 through a flexible quick connect coupling 74. Thus, liquid pumped from the primary tank 34 will collect in the secondary tank 64. Like the primary tank 34, the secondary tank 66 includes a heating element 76 and an aeration pipe 78. The former should provide enough heat to elevate the temperature of the liquid within the tank 74 to above the boiling point for water so that water may be boiled away. It should further be capable of operating at a lower temperature, that is, at a temperature sufficient to maintain the waste between about 95° F. and 100° F. which is about the temperature of the human body. The aeration pipe 78 extends along the bottom of the tank 64 where it is provided with a multitude of orifices that open downwardly. At its one end, the aeration pipe 78 extends through the end wall of the secondary tank 64 that is located remote from the sump 69 where the pipe 78 is connected with an air compressor 80. Thus, the air delivered by the air compressor will bubble through the waste in the tank 64. The interior of the secondary tank 64 is vented through a vent stack 82 containing a fan or draft inducer 82a. The tank 64 also contains a water level probe 83 that is connected to the heating element 76 through appropriate circuitry such that the heating element 76 is de-energized if the water within the tank 64 drops below a predetermined level. Likewise, the tank 64 contains a temperature probe 84 that is connected to the heating element 76 through appropriate circuitry so as to maintain the temperature of the water within the tank 64 constant at about 97° F. In addition, the tank 64 has a cutter 85 for shredding any solid material that has not already been shredded by the cutter 57 in the primary tank 34.

The secondary tank 64 has a discharge pipe 86 (FIG. 6) which extends outwardly through one of the walls for the tank 64. One end of the discharge pipe 86 is located close to the bottom of the secondary tank 64, while the other end is provided with a downwardly directed nozzle 88. Located within the discharge pipe 86 is an electrically driven pump 90. Thus, once the pump 90 is energized, liquid within the tank 64 is pumped out and discharged through the nozzle 88.

To collect the liquid derived from the secondary tank 64, the toilet facility A is further provided with a collection receptacle 92 (FIG. 6) including a frame 94 capable of supporting a large plastic bag 96 made of biodegradable plastic. The frame 94 also supports a cover 98 having an aperture large enough to receive the nozzle 88 at the end of the discharge pipe 86. Each bag is supplied with a chlorine tablet.

The air compressors 52 and 80 for the two tanks 34 and 64, respectively, are electrically powered, as are the pumps 60 and 90. The same is, of course, true of the cutters 57 and 85 and electric heating elements 48 and 76 in the tanks 34 and 64. All of the foregoing are connected through suitable switches and circuitry to an electric line leading to the toilet facility A. This may be a standard 110 volt line. Moreover, the motor for the pump 60 in the discharge pipe 86 leading away from the secondary tank 64 is controlled by a switch that includes a timer. The timer in turn is controlled by the pump 60 in the transfer pipe 58, it in effect being restarted each time the pump 60 is energized. The arrangement is such that the pump 90 will not operate within 48 to 96 hours of the last operation for the pump 60. Consequently, material pumped into the secondary tank 64 must remain in that tank for at least 48 to 96 hours before it can be removed through the discharge pipe 96.

OPERATION

Biological waste material is introduced into the primary tank 34 where it collects, and this material is mostly liquid that is rich in bacteria. Air derived from the compressor 52 bubbles through this liquid, it being introduced through the orifices in the aeration pipe 50. The air activates aerobic bacteria within the liquid, and that bacteria to a limited measure purifies the waste material. Offensive odors are eliminated through a vent stack 44 through which a constant stream of air is directed by the draft inducer 46. If the toilet facility A is not used much, the loss of water from the primary tank 34 by evaporation may exceed the water introduced into it by normal use. In that event, the user should add water by hand by turning the valve 63 for the supply tank 61.

When the liquid waste material in the primary tank 34 reaches a prescribed elevation in that tank, the water sensing probe 54 activates the pump 60 and causes the liquid waste material to flow into the secondary tank 64. Further purification occurs within this tank, for the secondary tank 64, like the primary tank 34, contains an aeration pipe 78 that discharges air, and the air in turn bubbles through the liquid waste material in the secondary tank 64. This air activates the aerobic bacteria and further purifies the water in the secondary tank 64. However, the air should bubble for at least 48 hours to obtain complete purification. Consequently, the pump 90, by which the secondary tank 64 is purged of its waste material, cannot be operated within 48 to 96 hours of the last operation of the pump 60. In other words, the pump 90 cannot be operated within 48 to 96 hours of the last addition to the secondary tank 64, thus insuring that all waste material in the tank is aerated for at least 48 to 96 hours.

The heating elements 48 and 76 in the tanks 34 and 64 maintain the waste material at about human body temperature, and that is the temperature at which the aerobic bacteria is most active. The heating elements 48 and 76 further prevent the waste material from freezing in below freezing temperatures. The heating elements 48 and 76, however, may be brought to a substantially higher temperature, and indeed to a temperature high enough to boil the water within their respective tanks. Consequently, it is possible to remove all water from the tanks 34 and 64 without physically pumping out the tanks 34 or 64 or otherwise draining water from them. This procedure for eliminating the water in the tanks 34 and 64 should be utilized immediately prior to long periods of idleness for the toilet facility A. For example, if the toilet facility A is used at a summer cottage, the tanks 34 and 64 should be boiled out at the end of the summer season so that the water will not freeze and perhaps crack the tanks during the winter months.

To restart the toilet facility A at the beginning of the next season, a liquid rich in aerobic bacteria may be poured into the primary tank 34, or the normal accumulation of waste may be used as the source of aerobic bacteria, although the latter requires somewhat longer for the toilet facility A to achieve maximum efficiency.

What is claimed is:

1. A toilet facility comprising an enclosure; first and second tanks, each being capable of holding liquid waste material therein, one of the tanks being located in the enclosure such that it is capable of receiving waste material from a person in the enclosure; first and second air conduits leading into the first and second tanks, respectively, and having portions located low enough in their respective tanks to be submerged in the liquid waste material within the tanks, the submerged portions of the conduits having apertures therein, the first and second air conduits being separated sufficiently to prevent liquid waste material from transferring between the tanks by way of the air conduits; means connected with the air conduits for forcing air through the conduits with sufficient pressure to enable the air to escape through the apertures and bubble through the liquid waste material in the tanks; and control means for insuring that pressurized air is forced through the air conduit leading into the other of the tanks for a predetermined time after the last addition of waste material to the other tank, whereby the waste material in the other tank is aerated for at least the predetermined time.

2. A toilet facility according to claim 1 and further comprising heating means in at least one of the tanks for maintaining that waste material in that tank at a predetermined temperature below the boiling point of water.

3. A toilet facility according to claim 2 wherein the heating means maintains the waste material of both tanks at the predetermined temperature.

4. A toilet facility according to claim 2 wherein the heating means further has the capability of elevating the waste material to a temperature above the boiling point of water so that the water within the waste material will evaporate.

5. A toilet facility according to claim 2 wherein the heating means comprises electrical heating elements embodied in the tank.

6. A toilet facility according to claim 1 wherein the second tank is located outside of the enclosure.

7. A toilet facility according to claim 1 wherein the enclosure has side walls, a dome-shaped roof, and a vent at the top of the dome-shaped roof.

8. A toilet facility according to claim 7 wherein the vent comprises a collar set rigidly into the dome-shaped roof at the top thereof, a sleeve threaded into the collar; and a cap closing the upper end of the sleeve, whereby when the sleeve is rotated the cap is elevated or lowered.

9. A toilet facility according to claim 8 wherein the cap projects outwardly beyond the sleeve so that it overlies a portion of the roof.

10. A toilet facility according to claim 7 wherein the cap possesses substantially the same contour as the dome-shaped roof.

11. A toilet facility according to claim 7 wherein the side walls project upwardly beyond the periphery of the dome-shaped roof to form a gutter around the dome-shaped roof.

12. A toilet facility according to claim 1 and further comprising a supply tank on the enclosure and connected with the first tank to supply additional water to the first tank, and a valve between the supply tank and the primary tank.

13. A toilet facility according to claim 9 wherein the first tank is removable from the enclosure and the enclosure includes a wall unit that is tapered so that a plurality of wall units may be nested for shipping purposes.

14. A toilet facility according to claim 9 wherein the predetermined time during which pressurized air is forced through the air conduit leading into the other tank is at least 48 hours.

15. A toilet facility comprising an enclosure; a first tank in the enclosure for collecting waste material; a second tank connected with the first tank so that waste material collected in the first tank will flow to the second tank; aeration means for bubbling air through the waste material in at least one of the tanks; means for removing waste material from the second tank; and control means for preventing removal of waste material from the second tank within a predetermined time after the last transfer of waste material from the first tank to the second tank.

16. A toilet facility according to claim 15 and further comprising a transfer pipe extending from the first tank to the second tank and a first pump in the transfer pipe for pumping the waste material from the first tank to the second tank; and wherein the control means is connected to the first pump and prevents the means for removing waste material from the second tank from being energized within said predetermined time.

17. A toilet facility according to claim 6 wherein the means for removing the waste material from the second tank comprises a discharge pipe extending from the interior of the second tank and a second pump in the discharge pipe; and wherein the control means prevents the first pump from being energized within the predetermined time after the second pump is energized.

18. A toilet facility according to claim 7 and further comprising heating means within each tank for maintaining the waste material in those tanks at a predetermined temperature below the boiling point of water.

19. A toilet facility comprising: an enclosure; first and second tanks, each being capable of holding liquid waste material therein, the first tank being located in the enclosure such that it is capable of receiving waste material from a person in the enclosure; first and second conduits leading into the first and second tanks, respectively, and having portions located low enough in their respective tanks to be submerged in the liquid within the tanks; the submerged portions of the conduits having apertures therein; means connected with the conduits for forcing air through the conduits with sufficient pressure to enable the air to escape through the apertures and bubble through the liquid waste material; an electrical heating element in each of the tanks; and means for controlling the heating elements such that they maintain the liquid waste material in their respective tanks at a temperature suitable for propagating bacteria within that liquid waste material.

20. A toilet facility according to claim 19 wherein the means for controlling the heating element maintains the liquid waste material in the two tanks at between about 95° and 100° F.

21. A toilet facility according to claim 19 wherein the electrical heating element in at least one of the tanks is further capable of elevating the temperature of the liquid waste material in its tank sufficiently to vaporize the water in the waste material.

* * * * *